United States Patent
Urbahn et al.

(10) Patent No.: US 7,428,941 B2
(45) Date of Patent: Sep. 30, 2008

(54) RESTRAINT SYSTEM FOR A MOTOR VEHICLE

(75) Inventors: Jan Urbahn, Ramsey, NJ (US); Richard Baur, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/710,496

(22) Filed: Feb. 26, 2007

(65) Prior Publication Data

US 2007/0200324 A1 Aug. 30, 2007

Related U.S. Application Data

(63) Continuation of application No. PCT/EP2005/008926, filed on Aug. 17, 2005.

(30) Foreign Application Priority Data

Aug. 27, 2004 (DE) .................. 10 2004 041 425

(51) Int. Cl.
*B60R 21/01* (2006.01)
(52) U.S. Cl. .................. 180/268; 280/735; 280/806; 280/807
(58) Field of Classification Search .................. 280/735, 280/806, 807; 701/45; 180/268; 307/10.1
See application file for complete search history.

(56) References Cited

U.S. PATENT DOCUMENTS 5,164,901 A * 11/1992 Blackburn et al. ............ 701/47
5,326,146 A 7/1994 Takeuchi
5,574,427 A * 11/1996 Cavallaro .................... 340/436
5,646,454 A 7/1997 Mattes et al.
5,796,177 A 8/1998 Werbelow et al.
6,566,765 B1 5/2003 Nitschke et al.
2004/0163871 A1* 8/2004 Nobusawa .................. 180/268
2004/0216939 A1* 11/2004 Lorenz et al. ............... 180/268
2006/0108787 A1 5/2006 Czaykowska et al.

FOREIGN PATENT DOCUMENTS

DE 44 47 174 A1 3/1996
DE 198 22 263 A1 11/1998

(Continued)

OTHER PUBLICATIONS

International Search Report dated Nov. 18, 2005 with the English translation (Six (6) Pages).

(Continued)

*Primary Examiner*—Ruth Ilan
(74) *Attorney, Agent, or Firm*—Crowell & Moring LLP

(57) ABSTRACT

A restraint system for a vehicle having sensors for detecting a collision of the vehicle is described. The system has a control unit which analyzes the signals and, in the event of a recognized collision of the motor vehicle, transmits a first signal to a safety belt restraint, which then activates a belt tensioner using a predefined first restraint force, and subsequently transmits a second signal to a front airbag system, which then triggers an airbag. The system has a malfunction monitoring unit for one of the restraint devices such that the control unit transmits a third signal to a replacement restraint device in the event that a malfunction of the front airbag system is recognized by the malfunction monitoring unit.

20 Claims, 3 Drawing Sheets

FOREIGN PATENT DOCUMENTS

| | | |
|---|---|---|
| DE | 198 13 921 A1 | 9/1999 |
| DE | 101 53 052 A1 | 10/2002 |
| DE | 102 30 483 A1 | 1/2004 |
| GB | 2 372 862 A | 9/2002 |
| WO | WO 02/092396 A1 * | 11/2002 |

OTHER PUBLICATIONS

German Office Action dated Mar. 1, 2005 with English translation of relevant portion (Seven (7) Pages).

* cited by examiner

RESTRAINT SYSTEM FOR A MOTOR VEHICLE

CROSS REFERENCE TO RELATED APPLICATIONS

This application is a continuation of PCT International Application No. PCT/EP2005/008926, filed Aug. 17, 2005, which claims priority under 35 U.S.C. § 119 to German Patent Application No. 10 2004 041 425.4 filed Aug. 27, 2004, the entire disclosures of which are herein expressly incorporated by reference.

BACKGROUND AND SUMMARY OF THE INVENTION

The present invention relates to a restraint system for a motor vehicle having sensors for detecting a collision of the motor vehicle, and a control unit for analyzing signals of the sensors.

A restraint system for vehicles is described in U.S. Pat. No. 5,326,146. In this restraint system, the data of sensors provided in the vehicle is analyzed by a control unit to determine a possible collision of the vehicle. If a collision is recognized, the control unit activates a first restraint device and, after a predefined time interval, a second restraint device. In addition, the activation or triggering of the first restraint device is monitored using a malfunction monitoring unit. If a malfunction is recognized upon the triggering of the first restraint device, the control unit immediately activates the second restraint device, i.e., without a time delay. In this restraint system, only a malfunction of the first restraint device is taken into consideration.

The present invention provides an improved restraint system which also considers a malfunction upon the triggering of the second restraint device.

The restraint system for a motor vehicle according to the present invention includes sensors for detecting a collision of the motor vehicle, and includes a control unit, which analyzes the sensor signals and transmits a first signal to a safety belt retention device as a first retention device in the event of a recognized collision of the motor vehicle, and activates a belt tensioner using a predefined first retention force. It then transmits a second signal to a front airbag system as a second retention device, which then triggers a front airbag after a predefined time interval following the activation of the belt tensioner. The system includes a malfunction monitoring unit for one of the retention devices, such that the control unit transmits a third signal to a replacement retention device, which then activates a replacement actuator, in the event a malfunction of the front airbag system is recognized by the malfunction monitoring unit.

An advantage of the restraint system according to the invention is that in the event of a malfunction of the front airbag system, the vehicle occupant(s) is (are) nonetheless well protected in the event of an accident. As is the case in already known restraint systems, signals of various sensors provided in the vehicle are analyzed with regard to an accident or a collision. The sensors may be acceleration sensors or pressure sensors, for example, which are installed in the vertical direction of the vehicle. The restraint system is implemented in such a way that upon recognition of a collision of the vehicle, the control unit first transmits a first signal to a safety belt restraint device, and subsequently transmits a second signal to the front airbag system. The safety belt restraint device activates an actuator for tensioning the belt, i.e., a belt tensioner, using a predefined first restraint force, upon transmission of the first signal. This is to prevent the driver from hitting the front airbag triggered by the second signal of the control unit unbraked, i.e., with too much energy. The restraint force is not to be too great, however, so that the vehicle occupant is not subject to unnecessary injuries from the restraint, such as broken ribs. Subsequently, the front airbag is triggered, according to the present invention, after a time delay relative to the belt tensioner. The chronological sequence for activating the actuators of the restraint devices is of special significance, in order to provide the occupants with optimal protection. The time delay is typically only very slight. According to the invention, it is unimportant whether the control device outputs the second signal with a delay with respect to the front airbag system activation, or the time delay is performed by the front airbag system itself.

The restraint system may also be implemented in such a way that the control unit triggers either only the first restraint device or, for example in the event of a stronger collision, both the first and second restraint devices as a function of the strength of the collision of the motor vehicle. In the restraint device according to the present invention, it is assumed that both the first and also the second restraint device can be activated or triggered.

If the front airbag does not trigger in response to a second signal transmitted by the control unit, and thus a malfunction of the front airbag system is recognized by the malfunction monitoring unit, the control unit transmits a third signal to a replacement restraint device, which then activates a replacement actuator. The occupant protection is thus further improved.

The replacement restraint device is advantageously the safety belt restraint device, to which the control unit transmits the third signal. Due to the third signal, the safety belt restraint device does not activate the belt tensioner using the predefined first restraint force, but rather using a predefined second restraint force, which is different from the first restraint force.

The second restraint force is advantageously greater than the first restraint force. This prevents the occupants from hitting the steering wheel or the dashboard in the event of a collision and a malfunction of the front airbag system, which could result in severe injuries to the occupants. The safety belt restraint device thus assumes the entire restraint or protective function.

The malfunction monitoring unit is advantageously implemented as an airbag triggering circuit monitoring unit, or as an interior sound pressure propagation monitoring unit using a microphone. Implementing the malfunction monitoring unit as an airbag triggering circuit monitoring unit offers the advantage that a malfunction may thus be recognized with a very high probability. If the malfunction monitoring unit is implemented as a sound pressure propagation monitoring unit, a microphone already provided in the vehicle, such as the microphone of the telephone system, may be used without incurring any additional costs.

The method for operating the restraint system according to the present invention will be discussed in the following description and figures, and will be explained in greater detail with reference to the drawings.

Other objects, advantages and novel features of the present invention will become apparent from the following detailed description of the invention when considered in conjunction with the accompanying drawings.

DETAILED DESCRIPTION OF THE DRAWINGS

Figure 1:
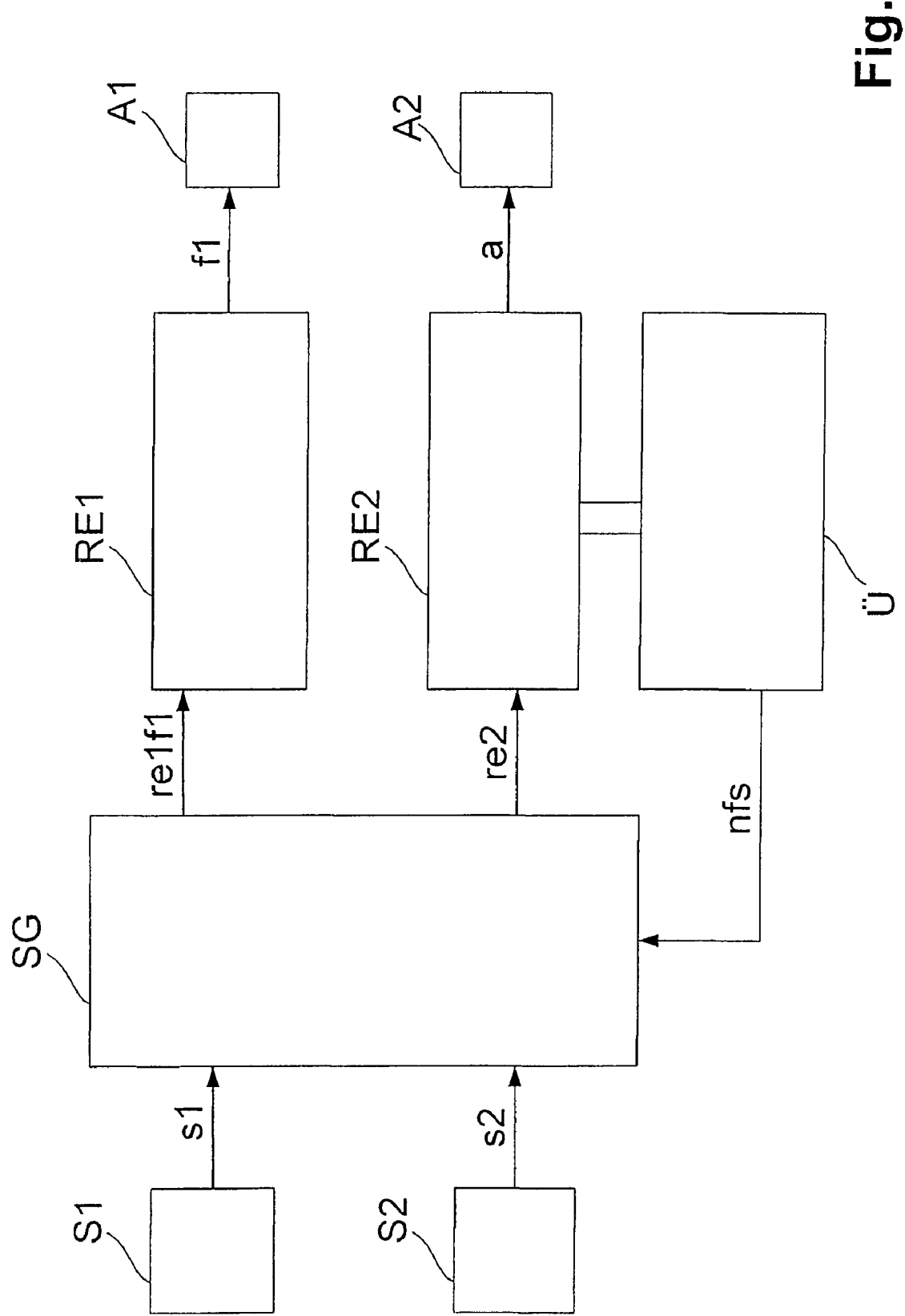
FIG. 1 shows a restraint system according to the present invention in a mode of operation without a malfunction of the front airbag system.
Figure 2:
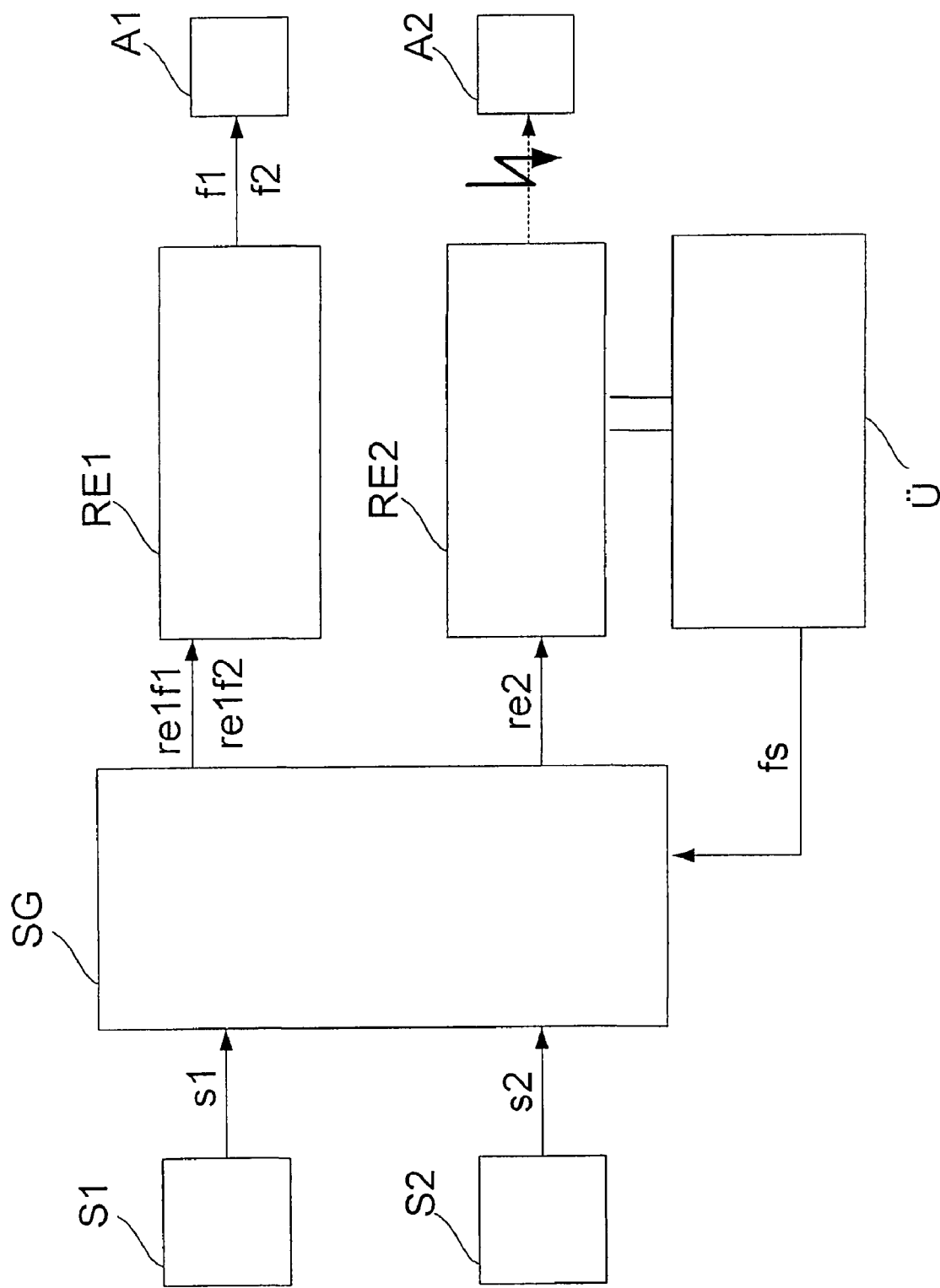
FIG. 2 shows a restraint system according to the present invention in a mode of operation in the event of a malfunction of the front airbag system.

An exemplary restraint system of a motor vehicle according to the present invention, illustrated in FIG. 1 and FIG. 2, includes sensors S1 and S2 for detecting a collision of the motor vehicle, which transmit signals s1 and s2 to a control unit SG. The control unit SG analyzes the signals s1 and s2 from the sensors S1 and S2 with respect to a possible collision of the motor vehicle. If the control unit SG recognizes a collision of the motor vehicle from the sensor signals s1 and s2, it transmits a first signal re1f1 to, for example, a safety belt restraint device RE1, which acts as a first restraint device. The safety belt restraint device RE1 may activate a belt tensioner A1 for tensioning the belt using a predefined first restraint force f1, in response to the first signal re1f1 of the control unit SG. In addition, the control unit SG transmits a second signal re2, which has a time delay relative to the first signal re1f1, to, for example, a front airbag system RE2 acting as a second restraint device in the event of a recognized collision. The front airbag system RE2 may trigger a front airbag A2 using a signal "a" in response to the second signal re2 of the control device SG. In addition, the exemplary restraint system according to the present invention may include a malfunction monitoring unit Ü, which is connected to the front airbag system RE2 and monitors its mode of operation. The malfunction monitoring unit Ü may be advantageously implemented as an airbag ignition circuit monitoring unit, or as an interior sound pressure monitoring unit.

The condition shown FIG. 1 assumes that there is no malfunction related to the triggering of the front airbag A2 in response to the second signal re2 of the control unit SG. The malfunction monitoring unit Ü communicates the correct functioning of the front airbag system RE2 to the control unit SG using a signal "nfs". Instead of transmitting the signal "nfs", the malfunction monitoring unit Ü may also not transmit any signal in the event of correct functioning of the front airbag system RE2, to indicate to the control unit SG that there is no malfunction.

In contrast to FIG. 1, the condition shown in FIG. 2 assumes that there is a malfunction upon the triggering of the front airbag A2 by the front airbag system RE2. In embodiments where the malfunction monitoring unit Ü is implemented as an airbag ignition circuit monitoring unit, the malfunction monitoring may be performed by monitoring a resistance value in the ignition circuit. As soon as the front airbag is triggered, the resistance in the ignition circuit approaches infinity.

In other embodiments where the malfunction monitoring unit Ü is implemented as an interior sound pressure monitoring unit, a mode of operation of the front airbag system RE2 without malfunction may be recognized by a briefly increased sound pressure in the vehicle interior, directly after the triggering of the front airbag A2. If there is no briefly increased sound pressure, then a malfunction of the front airbag system RE2 may have occurred.

If it is established by the malfunction monitoring unit Ü that the front airbag A2 was not triggered upon the second signal re2 of the control unit SG, the malfunction monitoring unit Ü immediately transmits a signal "fs" to the control unit SG. The control unit SG then recognizes the malfunction of the front airbag system RE2 and, in response to the signal "fs" of the malfunction monitoring unit Ü, may immediately transmit a third signal re1f2 to a replacement restraint device RE1, which then activates a replacement actuator A1.

The replacement restraint device RE1 may advantageously include the safety belt restraint device RE1 already provided in the vehicle, which activates the belt tensioner A1 as the replacement actuator using a predefined second restraint force f2, in response to the third signal re1f2 of the control unit SG.

The second restraint force f2 may be greater than the first restraint force f1. This means that in this embodiment the belt tensioner A1 is first triggered using a low first restraint force f1 in the event of a collision of the motor vehicle. If there is a malfunction of the front airbag system RE2, according to the present invention, the belt tensioner A1 is subsequently activated using a second restraint force f2, greater than the first restraint force f1, since the safety belt restraint device RE1 is now the only functioning restraint device.

Figure 3:
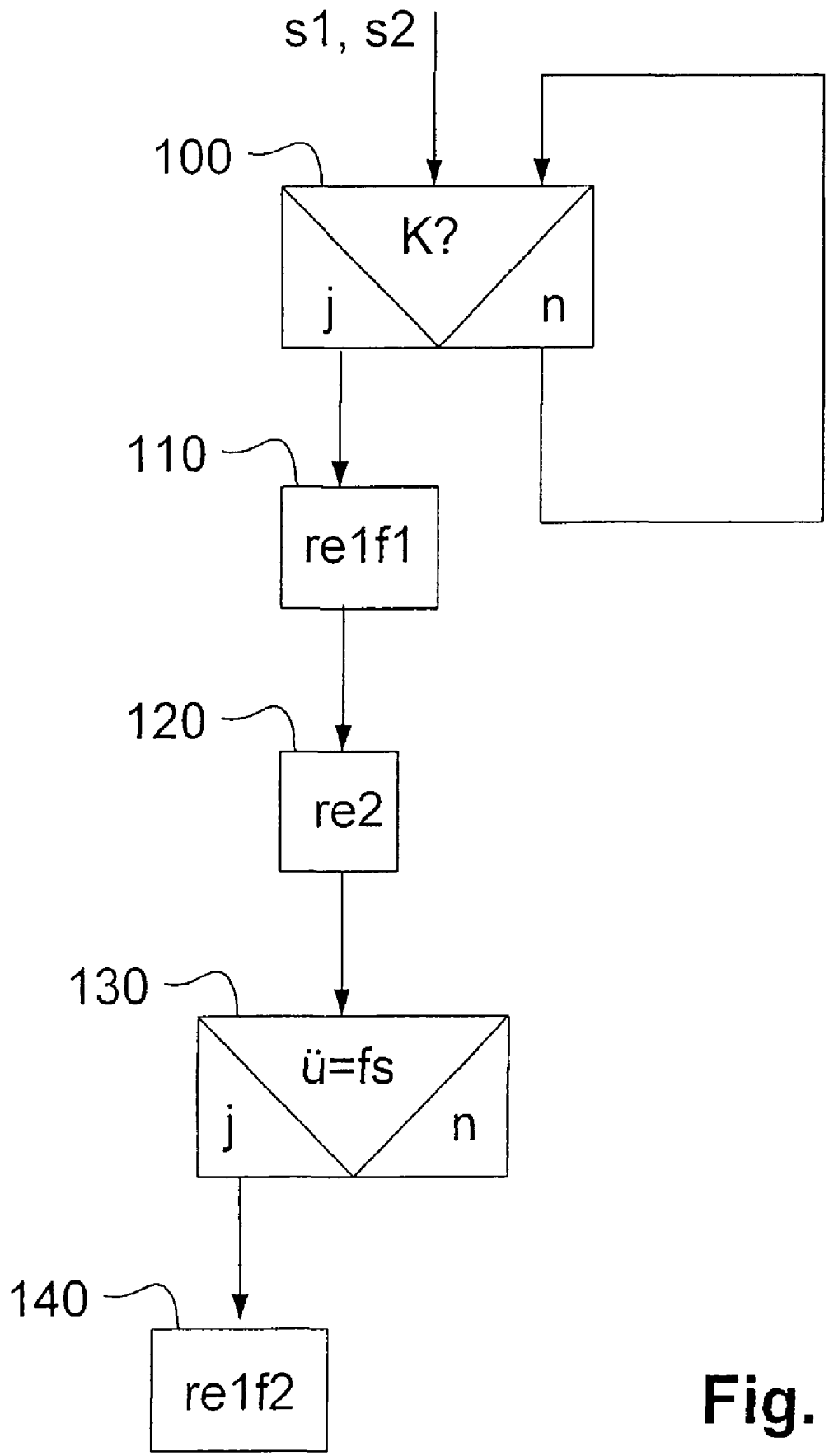
FIG. 3 shows a flowchart of the method for operating the restraint system according to the present invention.

A simplified flowchart of an exemplary method for operating the restraint system according to the present invention is illustrated in FIG. 3. In a first step 100, the signals s1 and s2 of the sensors S1 and S2 are analyzed with respect to a collision of the motor vehicle. As long as no collision is recognized in step 100, i.e., K=n, the signals s1 and s2 are checked again. If a collision is recognized, i.e., if K=j, a first signal re1f1 is generated in a step 110, which is transmitted to a safety belt restraint device (not shown), which subsequently activates a belt tensioner using a predefined first restraint force, as shown in FIG. 1 or FIG. 2.

Furthermore, in a step 120, a second signal re2 is generated with a delay relative to the first signal re1f1, and is transmitted to a front airbag system (not shown), which then triggers a front airbag deployment in accordance with FIG. 1.

In a next step 130, a malfunction monitoring unit (not shown) may be used to check with a query "fs" whether the front airbag system has triggered deployment of the front airbag, and/or whether the front airbag has deployed correctly. If there is no malfunction of the front airbag system, i.e., if fs=n, the restraint system is assumed to have triggered correctly. However, if there is a malfunction of the front airbag system, i.e., if fs=j, a third signal re1f2 is generated in a step 140, which is transmitted to the safety belt restraint device (not shown). This then activates the belt tensioner using a predefined second restraint force, in accordance with FIG. 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A restraint system for a motor vehicle comprising:
   sensors for detecting a collision of the motor vehicle;
   a control unit for analyzing signals of the sensors, which,
      when recognizing a collision of the motor vehicle, transmits a first signal to a first restraint device comprising a safety belt restraint device that activates a belt tensioner using a predefined first restraint force, and subsequently transmits a second signal to a second restraint device comprising a front airbag system that triggers a front airbag; and a malfunction monitoring unit for determining correct functioning of at least one of the restraint devices, wherein in the event a malfunction of the front airbag system is recognized by the malfunction monitoring unit after recognizing the collision, the control unit, following transmission of the first and second signals, transmits a third signal to the first restraint device that activates a replacement actuator.

2. The restraint system according to claim 1, wherein the replacement restraint device comprises the safety belt restraint device that, in response to the third signal of the control unit, activates the replacement actuator comprising the belt tensioner using a predefined second restraint force.

3. The restraint system according to claim 2, wherein the second restraint force is greater than the first restraint force.

4. The restraint system according to claim 1, wherein the malfunction monitoring unit comprises an airbag ignition circuit monitoring unit.

5. The restraint system according claim 1, wherein the malfunction monitoring unit comprises an interior sound pressure propagation monitoring unit.

6. A vehicle occupant restraint system, comprising:

a control unit operatively connected to vehicle sensors for recognizing from vehicle sensors signals a collision of the vehicle;

a first restraint device for restraining the occupant in response to a first signal of the control unit, the first signal being generated when recognizing the collision;

a second restraint device for restraining the occupant in response to a second signal of the control unit, the second signal being generated after the first signal; and a replacement actuator of the first restraint device for restraining the occupant in response to a third signal of the control unit, the third signal being generated, following transmission of the first and second signals, upon determining a failure of one of the first and second restraint devices after recognition of the collision.

7. The vehicle occupant restraint system according to claim 6, further comprising a malfunction monitoring unit operatively connected to the control unit for determining the failure of one of the first and second restraint devices.

8. The vehicle occupant restraint system according to claim 7, wherein the malfunction monitoring unit comprises an airbag ignition circuit monitoring unit.

9. The vehicle occupant restraint system according to claim 7, wherein the malfunction monitoring unit comprises a sound pressure propagation monitoring unit.

10. The vehicle occupant restraint system according to claim 6, wherein the first restraint device comprises a safety belt restraint device having a belt tensioner applying a first restraint force.

11. The vehicle occupant restraint system according to claim 6, wherein the second restraint device comprises an airbag system.

12. The vehicle occupant restraint system according to claim 6, wherein the replacement restraint device comprises a safety belt restraint device having a belt tensioner applying a second restraint force.

13. The vehicle occupant restraint system according to claim 12, wherein the second restraint force is greater than a first restraint force applied by the first restraint device.

14. The vehicle occupant restraint system according to claim 7, wherein the malfunction monitoring unit determines the failure of the second restraint device comprising an airbag system.

15. The vehicle occupant restraint system according to claim 6, wherein actuation of the second restraint system follows actuation of the first restraint system by a predefined time delay.

16. A method of restraining an occupant of a vehicle, the method comprising the acts of:

recognizing in a control unit a vehicle collision;

upon recognizing the vehicle collision, generating a first signal in the control unit causing a first restraint device to restrain the occupant;

generating a second signal in the control unit causing a second restraint device to restrain the occupant, after a predefined time delay;

determining in a malfunction monitoring unit whether a failure of the second restraint system occurred, after recognition of the vehicle collision; and if the failure occurred, generating a third signal in the control unit, after generation of the first and second signals, causing a replacement actuator of the first restraint device to restrain the occupant.

17. The method according to claim 16, further comprising causing a safety belt tensioner of the first restraint device to apply a first restraint force.

18. The method according to claim 17, further comprising causing the safety belt tensioner of the replacement restraint device to apply a second restraint force, greater than the first restraint force.

19. The method according to claim 16, further comprising causing an airbag system of the second restraint device to deploy.

20. The method according to claim 16, further comprising determining the failure of the second restraint system using one of an airbag ignition circuit monitoring unit and a sound pressure propagation monitoring unit.

* * * * *